(12) United States Patent
Chang et al.

(10) Patent No.: US 8,593,450 B2
(45) Date of Patent: Nov. 26, 2013

(54) RELAY DRIVING OF CONDUCTIVE SEGMENTS IN DISPLAYS

(75) Inventors: Shih Chang Chang, San Jose, CA (US); Hopil Bae, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 148 days.

(21) Appl. No.: 12/976,978

(22) Filed: Dec. 22, 2010

(65) Prior Publication Data
US 2012/0162090 A1  Jun. 28, 2012

(51) Int. Cl.
*G06F 3/038* (2013.01)
*G09G 5/00* (2006.01)

(52) U.S. Cl.
USPC .......................................... 345/214; 345/173

(58) Field of Classification Search
USPC .................................................. 345/173, 214
See application file for complete search history.

(56) References Cited

U.S. PATENT DOCUMENTS

| | | | |
|---|---|---|---|
| 4,973,135 A | 11/1990 | Okada et al. |
| 5,357,266 A | 10/1994 | Tagawa |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,079,122 B2 | 7/2006 | Morita |
| 7,184,064 B2 | 2/2007 | Zimmerman et al. |

(Continued)

FOREIGN PATENT DOCUMENTS

| | | |
|---|---|---|
| EP | 0 526 713 A2 | 2/1993 |
| EP | 0 571 230 A1 | 11/1993 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Kwang-Su Yang
(74) *Attorney, Agent, or Firm* — Morrison & Foerster LLP

(57) ABSTRACT

Multiple Vcom segments of display screens can be driven in a relay fashion, such that the driving of different Vcom segments overlaps. For example, a Vcom signal can be applied to a first segment of Vcom, and lines of display pixels in the first segment can be scanned. When scanning nears the end of the first segment, a Vcom signal can be applied to the next segment of Vcom before scanning in the first segment ends. For example, when the second-to-the-last line of display pixels in a segment of Vcom is scanned, the next Vcom segment can be driven with a Vcom signal. Likewise, when scanning in the next segment of Vcom begins, the Vcom signal can continue to be applied to the first segment of Vcom until a few lines of display pixels in the next segment have been scanned.

26 Claims, 15 Drawing Sheets

(56) References Cited

U.S. PATENT DOCUMENTS

| | | |
|---|---|---|
| 7,663,607 B2 | 2/2010 | Hotelling et al. |
| 2005/0253829 A1 | 11/2005 | Mamba et al. |
| 2006/0026521 A1 | 2/2006 | Hotelling et al. |
| 2006/0197753 A1 | 9/2006 | Hotelling |
| 2009/0015570 A1 | 1/2009 | Yamazaki |
| 2009/0256833 A1* | 10/2009 | Huang et al. ............ 345/213 |
| 2010/0194697 A1* | 8/2010 | Hotelling et al. ........ 345/173 |

FOREIGN PATENT DOCUMENTS

| | | |
|---|---|---|
| EP | 0 720 116 A2 | 7/1996 |
| EP | 1 122 587 B1 | 8/2001 |
| JP | 2000-163031 A | 6/2000 |
| JP | 2002-342033 A | 11/2002 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

RELAY DRIVING OF CONDUCTIVE SEGMENTS IN DISPLAYS

FIELD OF THE DISCLOSURE

This relates generally to driving common electrodes of display screens and touch screens, and more particularly, to a relay driving of multiple common electrode segments of display screens and touch screens.

BACKGROUND OF THE DISCLOSURE

Many types of display screens utilize a common electrode within the display panel. For example, liquid crystal displays (LCDs) can use a common electrode that spans the entire display to provide a common voltage to all of the display pixels. Common electrodes can be formed of, for example, a transparent conductor such as indium tin oxide (ITO). Pixel voltages can be applied to pixel electrodes in individual display pixels, for example, to create an electric field between the pixel electrode and the common electrode. In LCDs, the electric field created by a common electrode and a pixel electrode can be controlled to cause the liquid crystal of the display pixel to allow more or less light from a backlight to pass through the display pixel. Consequently, the luminance or brightness of each display pixel can be controlled. Likewise, many touch screens can utilize a common electrode within the display panel.

SUMMARY

Multiple Vcom segments of display screens can be driven in a relay fashion, such that the driving of different Vcom segments overlaps. For example, a Vcom signal can be applied to a first segment of Vcom, and lines of display pixels in the first segment can be scanned. When scanning nears the end of the first segment, a Vcom signal can be applied to the next segment of Vcom before scanning in the first segment ends. For example, when the second-to-the-last line of display pixels in a segment of Vcom is scanned, the next Vcom segment can be driven with a Vcom signal Likewise, when scanning in the next segment of Vcom begins, the Vcom signal can continue to be applied to the first segment of Vcom until a few lines of display pixels in the next segment have been scanned. In this way, for example, some visual artifacts may be reduced or eliminated.

DETAILED DESCRIPTION

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

The following description includes examples of driving multiple Vcom segments of display screens in a relay fashion, such that the driving of different Vcom segments overlaps. In some embodiments, a Vcom signal can be applied to a first segment of Vcom, and lines of display pixels in the first segment can be scanned. When scanning nears the end of the first segment, a Vcom signal can be applied to the next segment of Vcom before scanning in the first segment ends. When scanning in the next segment of Vcom begins, the Vcom signal can continue to be applied to the first segment of Vcom until a few lines of display pixels in the next segment have been scanned. In this way, for example, some visual artifacts may be reduced or eliminated.

Although various embodiments include "lines" of display pixels that are scanned to update a displayed image, the scanned lines of display pixels need not be strictly linear, but can include scanned groups of display pixels that are zig-zag, curved, or any group or subset of display pixels that is scanned to update a displayed image.

Figure 1C:
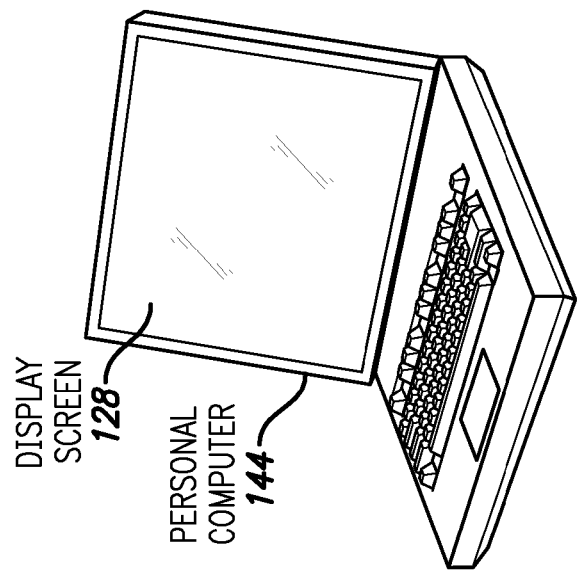
FIGS. 1A-1C illustrate an example mobile telephone, an example media player, and an example personal computer that each include an example touch screen according to embodiments of the disclosure.
Figure 1B:
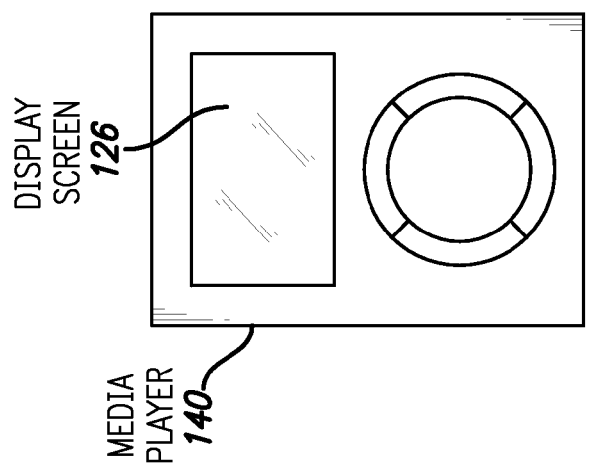
Figure 1A:
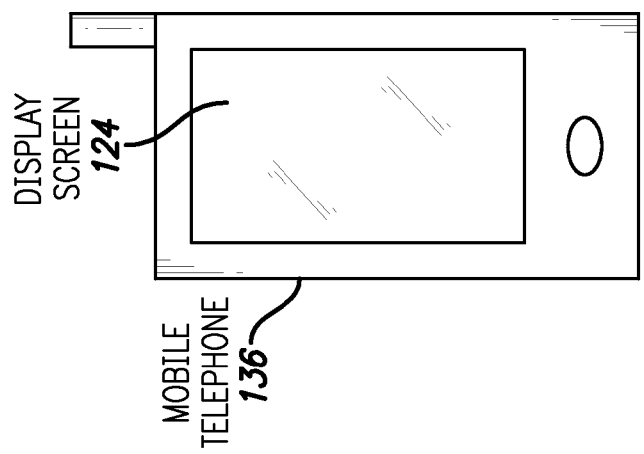

FIGS. 1A-1C show example systems in which a display screen according to embodiments of the disclosure may be implemented. FIG. 1A illustrates an example mobile telephone 136 that includes a display screen 124. FIG. 1B illustrates an example digital media player 140 that includes a display screen 126. FIG. 1C illustrates an example personal computer 144 that includes a display screen 128. In some embodiments, display screens 124, 126, and 128 can be touch screens that include touch sensing functionality based on, for example, mutual capacitance, as described in more detail below.

Figure 2:
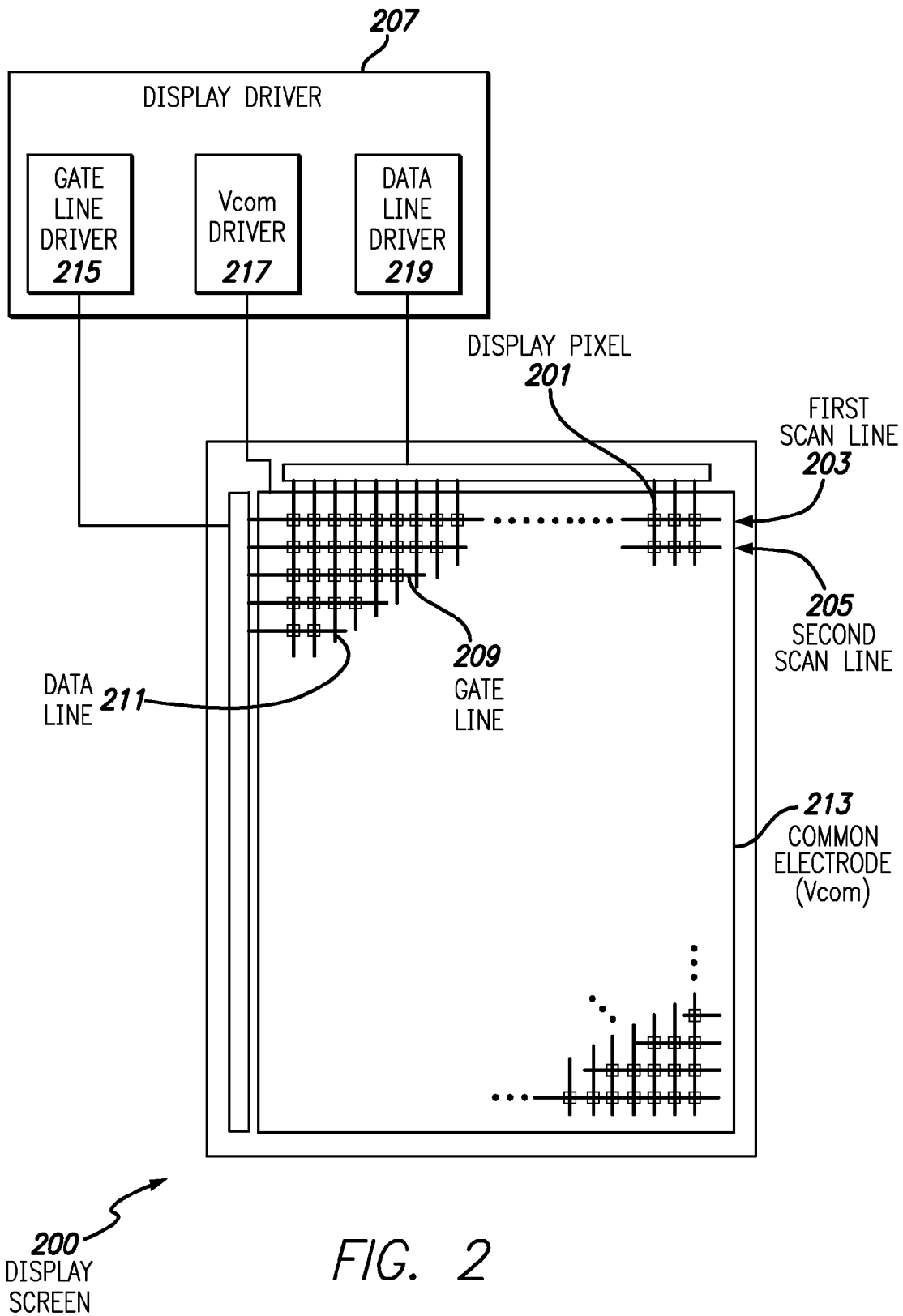
FIG. 2 illustrates an example display screen including multiple display pixels arranged in scan lines.

FIG. 2 illustrates an example display screen 200 including multiple display pixels 201 arranged in lines, such as a first scan line 203 and a second scan line 205. Display screen 200 can include multiple gate lines 209, with each gate line running through a scan line of display pixels 201. Display screen 200 can also include multiple data lines 211, with each data line addressing one of the display pixels in each scan line. Display screen 200 can also include a single common electrode (Vcom) 213 that spans all of the display pixels 201 of the display screen. Vcom 213 can be formed of, for example, a single sheet of transparent conductor, such as indium tin oxide (ITO).

A display driver 207 can include a gate line driver 215, a Vcom driver 217, and a data line driver 219. Display driver 207 can display an image on display screen 200 by scanning a scan line to apply a pixel voltage to each display pixel 201 in the scan line, scanning a next scan line to apply the pixel voltages in the next scan line, and so forth. The pixel voltages can control, for example, the luminances of the display pixels. For example, in a liquid crystal display (LCD), the pixel voltage can control the liquid crystal of a display pixel to allow more or less light from a backlight to pass through the display pixel.

In one example scanning operation, Vcom driver 217 can apply a Vcom signal, such as an alternating current (AC) signal, to Vcom 213. For example, the Vcom signal can be a square wave with a period equal to twice a scanning time of a single scan line. Initially, gate line driver 215 can switch pixel transistors of all display pixels 201 to an "off" state. Scanning can begin during the first half of the period of the Vcom signal, for example, when the Vcom signal is a positive voltage. Gate line driver 215 can switch pixel transistors of display pixels 201 in first scan line 203 to an "on" state by applying an appropriate gate line voltage to the gate line 209 of first scan line 203. Data line driver 219 can apply data signals to data lines 211, and with the pixel transistors of first scan line 203 in the "on" state, the pixel voltages of display pixels 201 in the first scan line can be set based on the data signals and the positive voltage of the Vcom signal.

The next scan line, e.g., second scan line 205, can be scanned during the second half of the period of the Vcom signal, for example, when the Vcom signal is a negative voltage. Gate line driver 215 can switch "off" the pixel transistors of first scan line 203 and can switch "on" the pixel transistors of second scan line 205. Data line driver 219 can apply data signals to data lines 211, and with the pixel transistors in the "on" state, the pixel voltages of display pixels 201 in second scan line 203 can be set based on the data signals and the negative voltage of the Vcom signal. Scanning can continue with the application of pixel voltages to the scan lines occurring during alternating positive and negative Vcom voltages.

In example display screen 200, a single Vcom 213 can be associated with all of the display pixels 201 in the display screen. Vcom driver 217 can drive Vcom 213, i.e., an entire sheet of ITO spanning all of the display pixels in this example, throughout the scanning of all of the scan lines of the display screen.

Figure 3:
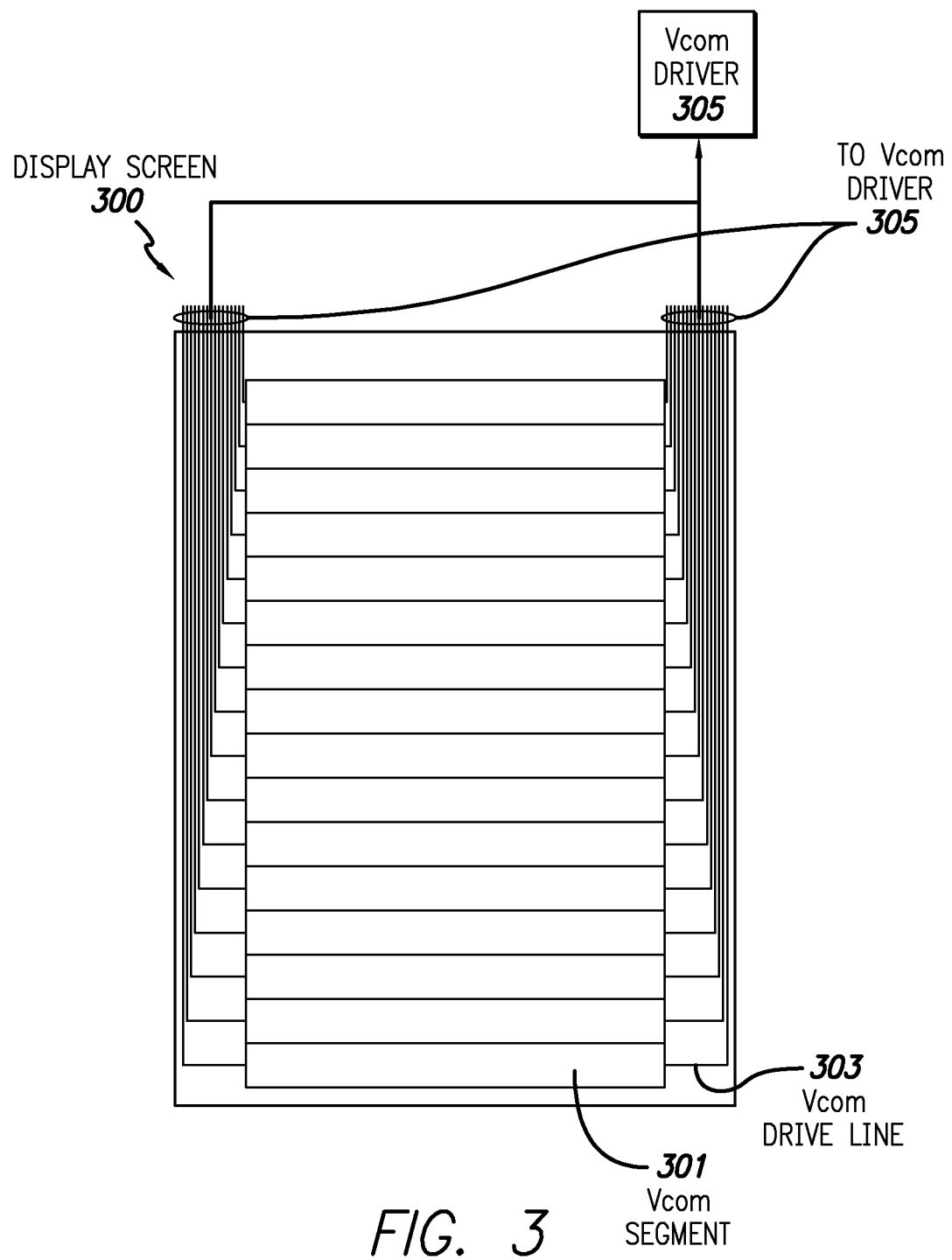
FIG. 3 illustrates an example display screen including multiple Vcom segments according to various embodiments.

An example operation of a display screen including Vcom segments will now be described in reference to FIGS. 3-5. FIG. 3 illustrates an example display screen 300 including multiple Vcom segments 301 according to various embodiments. For example, display screen 300 can include 960 scan lines of display pixels and sixteen Vcom segments 301, with each Vcom segment spanning sixty scan lines. Vcom drive lines 303 can connect each Vcom segment to a Vcom driver 305. Multiple Vcom segments 301 can be used in place of the single Vcom of display screen 200 shown in FIG. 2, for example. Other structures of display screen 300, such as gate lines, data lines, etc., can be similar to display screen 200.

Figure 4:
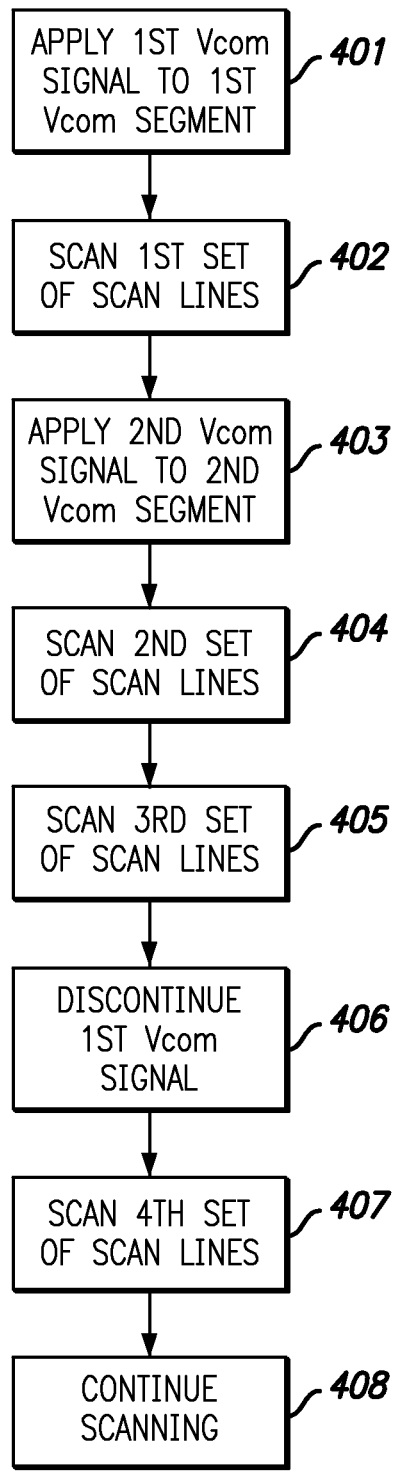
FIG. 4 is a flowchart of an example method of scanning display screen according to various embodiments.

FIG. 4 is a flowchart of an example method of scanning display screen 300 according to various embodiments. FIG. 5 illustrates the scanning of display screen 300 at various times according to the example method of scanning shown in FIG. 4. Referring to FIGS. 4-5, Vcom driver 305 can apply (401) a first Vcom signal to a first Vcom segment 501 associated with each of the display pixels in first sixty scan lines. The first Vcom signal can be an AC signal, such as a square wave. A first set of the sixty scan lines associated with first Vcom segment 501 can be scanned (402). The first set of scan lines can include, for example, the first 58 scan lines associated with first Vcom segment 501. Scanning each scan line can be performed, e.g., as described above in reference to display screen 200 of FIG. 2.

Figure 5:
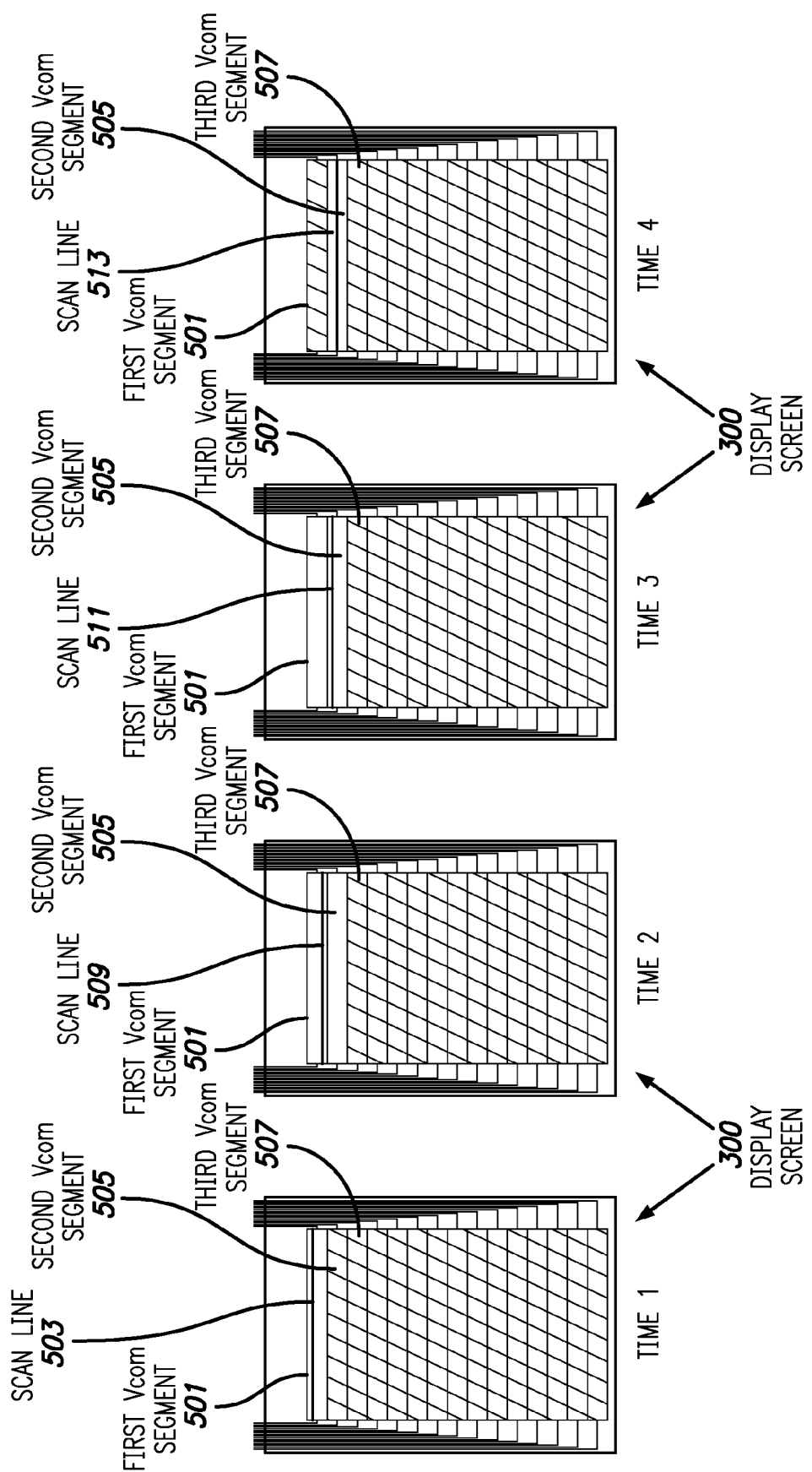
FIG. 5 illustrates an example scanning of a display screen at various times according to the example method of scanning shown in FIG. 4.

FIG. 5 illustrates display screen 300 at a Time 1, during which a scan line 503 of the first set of scan lines, e.g., the 1st through 58th scan lines of display screen 300, is being scanned. During the scanning of the first set of scan lines, Vcom driver 305 can apply no Vcom signal to the other Vcom segments, including a second Vcom segment 505 and a third Vcom segment 507. For the purpose of clarity, diagonal hatching through a Vcom segment shown in FIG. 5 signifies that no Vcom signal is being applied at that time to the Vcom segment. Next, Vcom driver 305 can apply (403) a second Vcom signal to second Vcom segment 505, and a second set, e.g., the last two scan lines, of the sixty scan lines associate with first Vcom segment 501 can be scanned (404). Thus, the last two scan lines associated with first Vcom segment 501 can be scanned while the first and second Vcom signals are being applied to first Vcom segment 501 and second Vcom segment 505, respectively. In other words, the second Vcom signal can be applied to second Vcom segment 505 during a time in which scan lines associated with first Vcom segment are being scanned. This overlap of driving second Vcom segment 505 during scanning of scan lines of first Vcom segment 501, for example, may help reduce or eliminate some visual artifacts.

FIG. 5 illustrates display screen 300 at a Time 2, during which a scan line 509 of the second set of scan lines is being scanned. During the scanning of the second set of scan lines, e.g. the 59th and 60th scan lines of display screen 300, Vcom driver 305 can apply no Vcom signal to Vcom segments other than first Vcom segment 501 and second Vcom segment 505. Next, a third set of scan lines, e.g., the 1st and 2nd scan lines of second Vcom segment 505 (i.e., the 61st and 62nd scan lines of display screen 300), can be scanned (405).

FIG. 5 illustrates display screen 300 at a Time 3, during which a scan line 511 of the third set of scan lines is being scanned prior to discontinuing the application of the first Vcom signal to first Vcom segment 501. During the scanning of the third set of scan lines, e.g. the 61st and 62nd scan lines of display screen 300, Vcom driver 305 can apply no Vcom signal to Vcom segments other than first Vcom segment 501 and second Vcom segment 505. Next, Vcom driver 305 can discontinue (406) applying the first Vcom signal to first Vcom segment 501. In some embodiments, the first Vcom signal can be discontinued prior to scanning of scan lines of second Vcom segment 505. However, in the example embodiment of FIGS. 4-5, the first Vcom signal can be applied to first Vcom segment 501 while the third set of scan lines of second Vcom segment 505 is scanned, such that the third set of scan lines is scanned while the first and second Vcom signals are being applied. This overlap of driving first Vcom segment 501 during scanning of scan lines of second Vcom segment 505, for example, may further help reduce or eliminate some visual artifacts.

Next, a fourth set of scan lines, e.g., the 3rd through 58th scan lines of second Vcom segment 505 (i.e., the 63rd though 118th scan lines of display screen 300), can be scanned (407) while the second Vcom signal is being applied and the first Vcom signal is not being applied. FIG. 5 illustrates display screen 300 at a Time 4, during which a scan line 513 of the fourth set of scan lines is being scanned. During the scanning of the fourth set of scan lines, Vcom driver 305 can apply no Vcom signal to Vcom segments other than second Vcom segment 505. The method of scanning can continue (408) as described above until the entire display screen has been scanned.

In some embodiments, scanning of each scan line can be performed in 16 microseconds, for example. In this case, an overlap of the first and second Vcom signals can be 64 microseconds in the example method of FIGS. 4-5 with the second and third sets of scan lines each including two scan lines. In other words, the first and second Vcom signals can be applied concurrently during scanning of four scan lines, with application of the second Vcom signal beginning two scan lines prior to the start of scanning in second Vcom segment 505, and application of the first Vcom signal discontinuing two scan lines after the end of scanning in first Vcom segment 501.

Although sequential scanning of scan lines is described in example embodiments, one skilled in the art would understand that other methods of scanning could be used, such as scanning every other scan line. Furthermore, although example embodiments describe that the second and third sets can include scan lines adjacent to the next (or previous) Vcom segment, it should be understood that scan lines other than the scan lines adjacent to the next (or previous) Vcom segment can be used.

Figure 6:
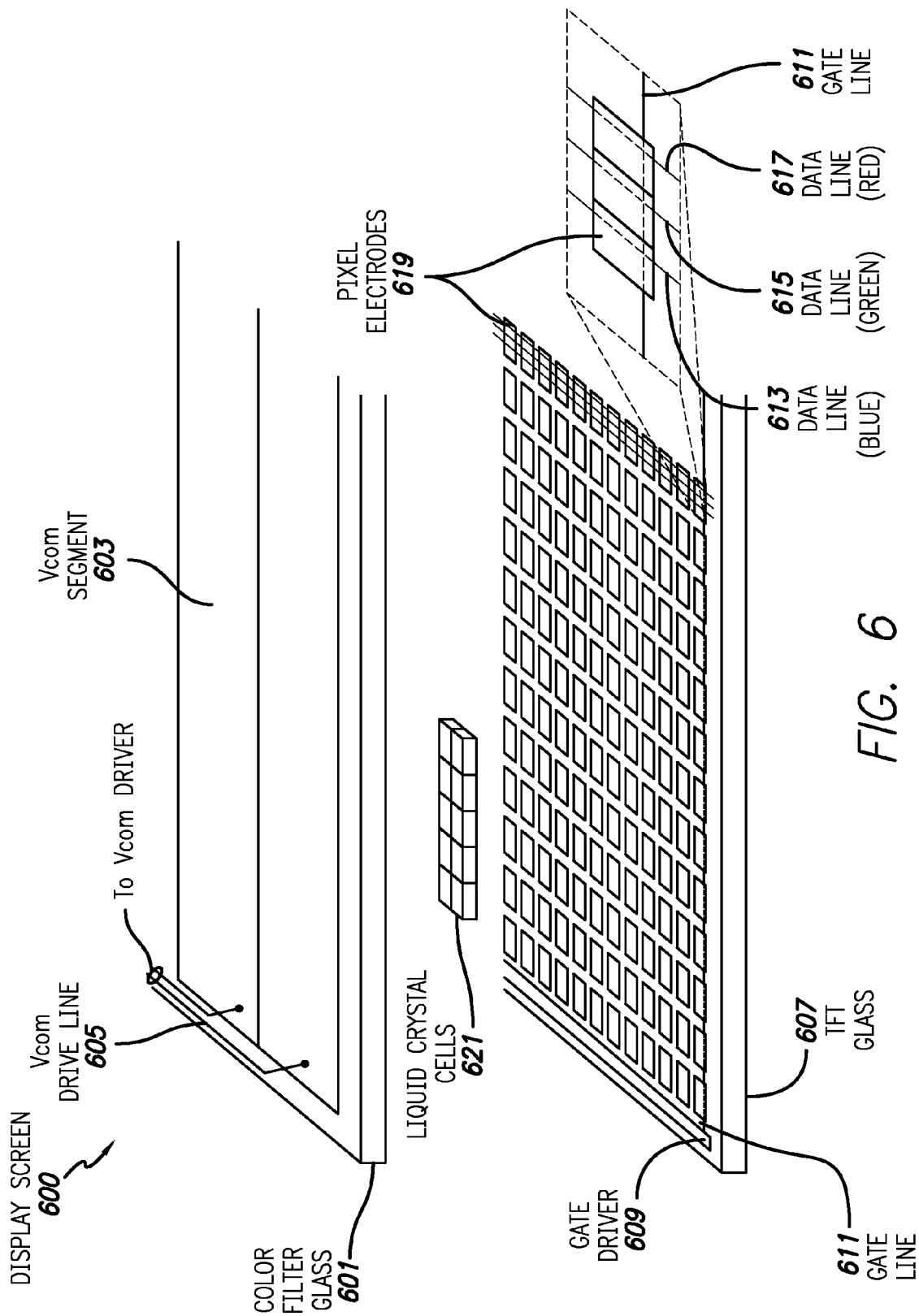
FIG. 6 illustrates an exploded perspective view of a portion of an example electrically controlled birefringence (ECB) LCD display screen according to various embodiments.
Figure 7:
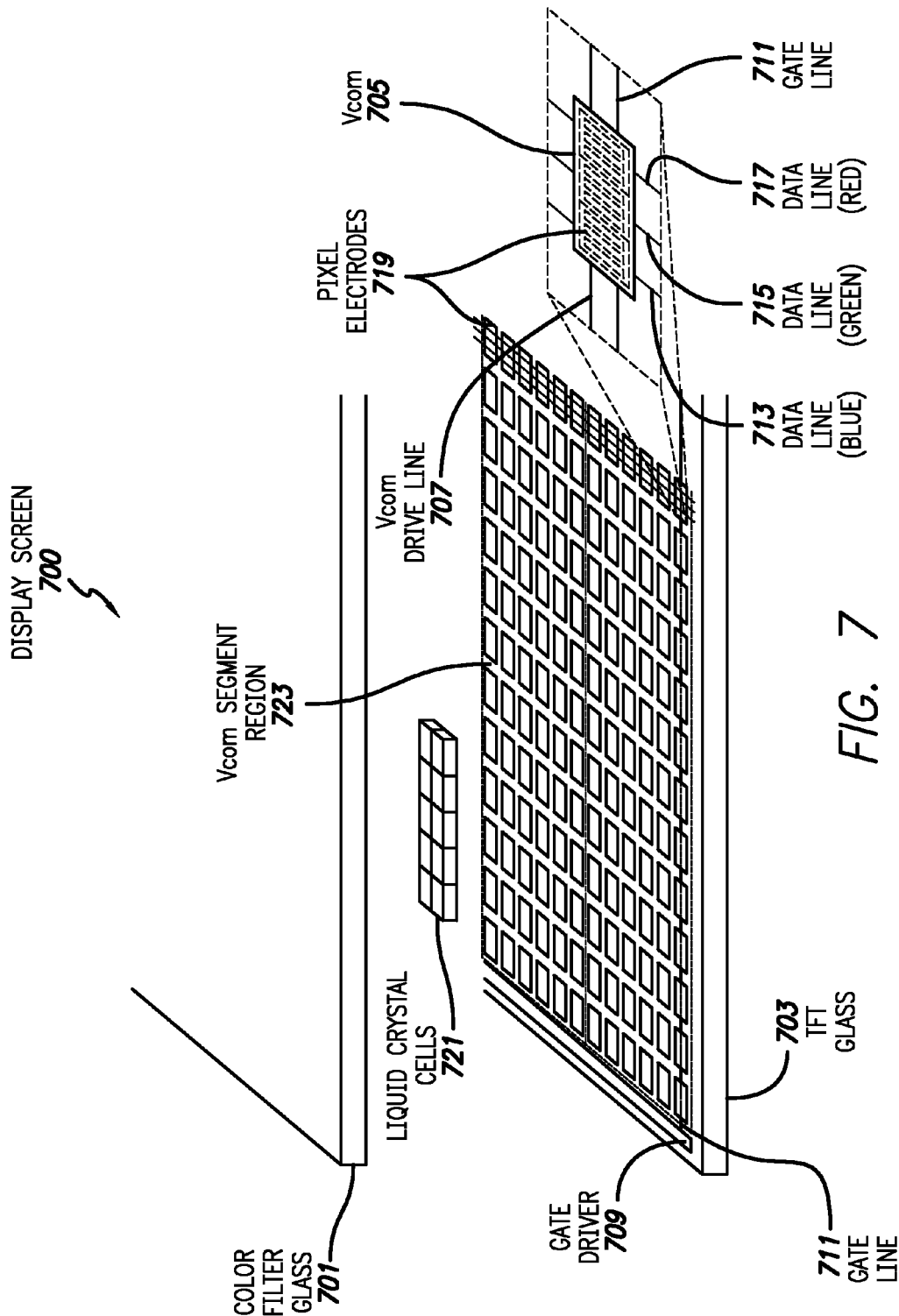
FIG. 7 illustrates an exploded perspective view of a portion of an example in-plane switching (IPS) LCD display screen according to various embodiments.

FIGS. 6 and 7 illustrate various example structures and configurations of display screens according to embodiments of the disclosure. FIG. 6 illustrates an exploded perspective view of a portion of an example electrically controlled birefringence (ECB) LCD display screen 600 according to various embodiments. Display screen 600 can include a color filter glass 601, with Vcom segments 603 and Vcom drive lines 605 formed thereon. A thin-film transistor (TFT) glass 607 can include a gate driver 609 that drives gate line 611, data lines for blue 613, green 615, and red 617 data, and pixel electrodes 619. Liquid crystal cells 621 can be disposed between pixel electrodes 619 and Vcom segments 603, such that an electric field can be generated between a pixel electrode and an associated Vcom segment. In this example embodiment, gate driver 609 can scan lines of display pixels associated with gate lines 611, and a Vcom driver (not shown) can drive Vcom segments 603 according to the method of FIGS. 4-5, for example.

FIG. 7 illustrates an exploded perspective view of a portion of an example in-plane switching (IPS) LCD display screen 700 according to various embodiments. Display screen 700 can include a color filter glass 701. A TFT glass 703 can include individual Vcoms 705 associated with each display pixel, Vcom drive lines 707, a gate driver 709 that drive gate line 711, data lines for blue 713, green 715, and red 717 data, and pixel electrodes 719. Vcom drive lines 707 can be conductive lines that connect together the Vcom 705 to form Vcom segment regions 723 that can function as Vcom segments. Liquid crystal cells 721 can be disposed over pixel electrodes 719 and Vcom 703, such that an electric field can be generated between a pixel electrode and an associated Vcom. In this example embodiment, gate driver 709 can scan lines of display pixels associated with gate lines 711, and a Vcom driver (not shown) can drive Vcom segment regions 723, which can correspondingly drive individual Vcom 705, according to the method of FIGS. 4-5, for example.

In some embodiments, a display screen can include touch sensing functionality, i.e., a touch screen. For example, a mutual capacitance based touch system can include drive regions and sense regions, such as drive lines and sense lines. Drive lines can be formed in rows while sense lines can be formed in columns (e.g., orthogonal), for example. Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some embodiments, a touch screen can be multi-touch, single touch, projection scan, full-imaging multi-touch, capacitive touch, etc.

Figure 8:
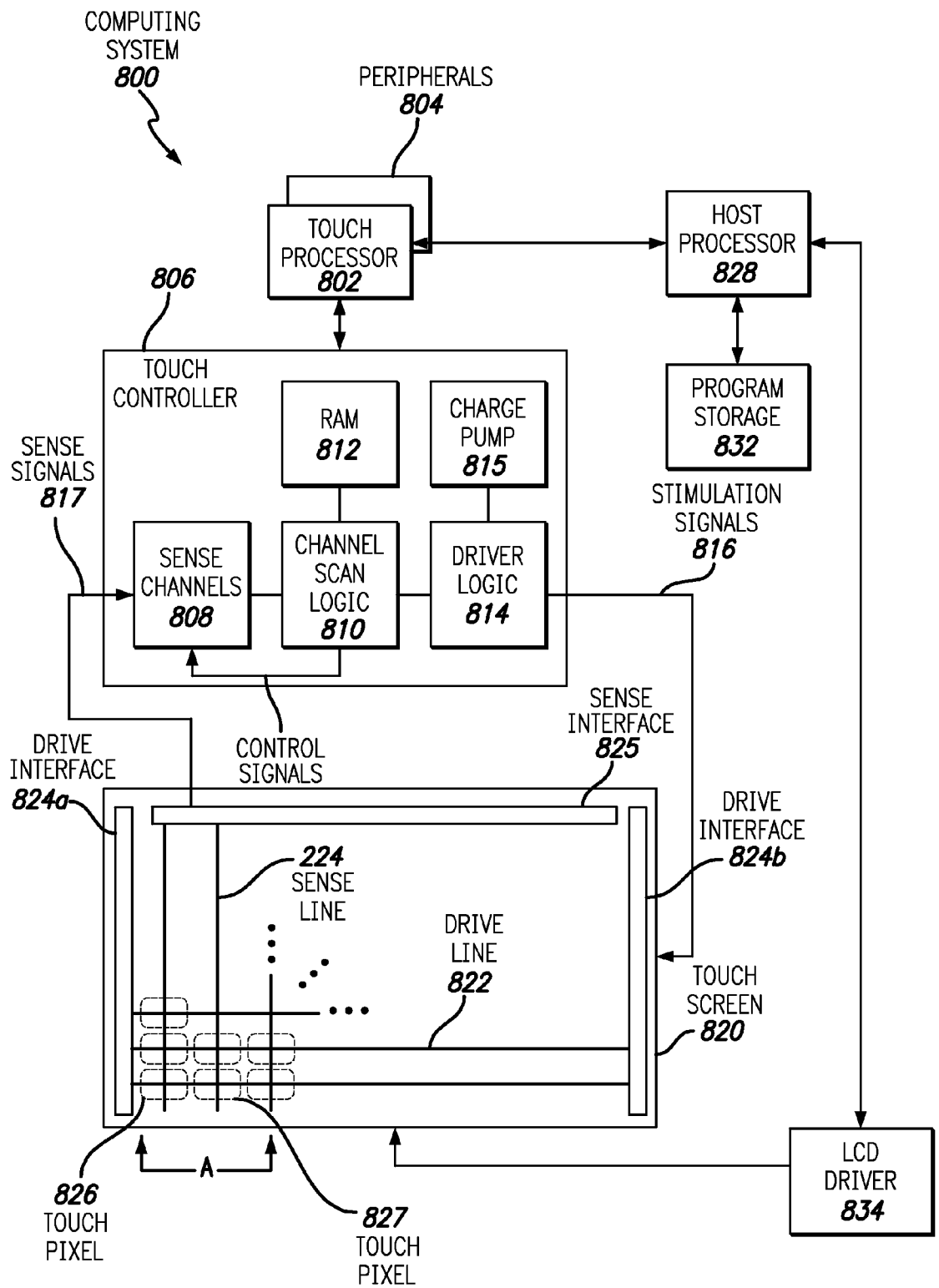
FIG. 8 is a block diagram of an example computing system according to various embodiments.

FIG. 8 is a block diagram of an example computing system 800 that illustrates one implementation of an example touch screen 820 according to embodiments of the disclosure. Computing system 800 could be included in, for example, mobile telephone 136, digital media player 140, personal computer 144, or any mobile or non-mobile computing device that includes a touch screen. Computing system 800 can include a touch sensing system including one or more touch processors 802, peripherals 804, a touch controller 806, and touch sensing circuitry (described in more detail below). Peripherals 804 can include, but are not limited to, random access memory (RAM) or other types of memory or storage, watchdog timers and the like. Touch controller 806 can include, but is not limited to, one or more sense channels 808, channel scan logic 810 and driver logic 814. Channel scan logic 810 can access RAM 812, autonomously read data from the sense channels and provide control for the sense channels. In addition, channel scan logic 810 can control driver logic 814 to generate stimulation signals 816 at various frequencies and phases that can be selectively applied to drive lines of the touch sensing circuitry of touch screen 820, as described in more detail below. In some embodiments, touch controller 806, touch processor 802 and peripherals 804 can be integrated into a single application specific integrated circuit (ASIC).

Computing system 800 can also include a host processor 828 for receiving outputs from touch processor 802 and performing actions based on the outputs. For example, host processor 828 can be connected to program storage 832 and a display controller, such as an LCD driver 834. Host processor 828 can use LCD driver 834 to generate an image on touch screen 820, such as an image of a user interface (UI), and can use touch processor 802 and touch controller 806 to detect a touch on or near touch screen 820, such a touch input to the displayed UI. The touch input can be used by computer programs stored in program storage 832 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 828 can also perform additional functions that may not be related to touch processing.

Touch screen 820 can include touch sensing circuitry that can include a capacitive sensing medium having a plurality of drive lines 822 and a plurality of sense lines 823. It should be noted that the term "conductive lines" is a sometimes used herein to mean simply conductive pathways, as one skilled in the art will readily understand, and is not limited to elements that are strictly linear, but includes pathways that change direction, and includes pathways of different size, shape, materials, etc, and multiple electrically conductive circuit elements that can be electrically connected to form a single electrically conductive pathway. Drive lines 822 can be driven by stimulation signals 816 from driver logic 814 through drive interfaces 824*a* and 824*b*, and resulting sense signals 817 generated in sense lines 823 can be transmitted through a sense interface 825 to sense channels 808 (also referred to as an event detection and demodulation circuit) in touch controller 806. In this way, drive lines and sense lines can be part of the touch sensing circuitry that can interact to form capacitive sensing nodes, which can be thought of as touch picture elements (touch pixels), such as touch pixels 826 and 827. This way of understanding can be particularly useful when touch screen 820 is viewed as capturing an "image" of touch. In other words, after touch controller 806 has determined an amount of touch detected at each touch pixel in the touch screen, the pattern of touch pixels in the touch screen at which a touch occurred can be thought of as an "image" of touch (e.g. a pattern of fingers touching the touch screen).

Figure 9:
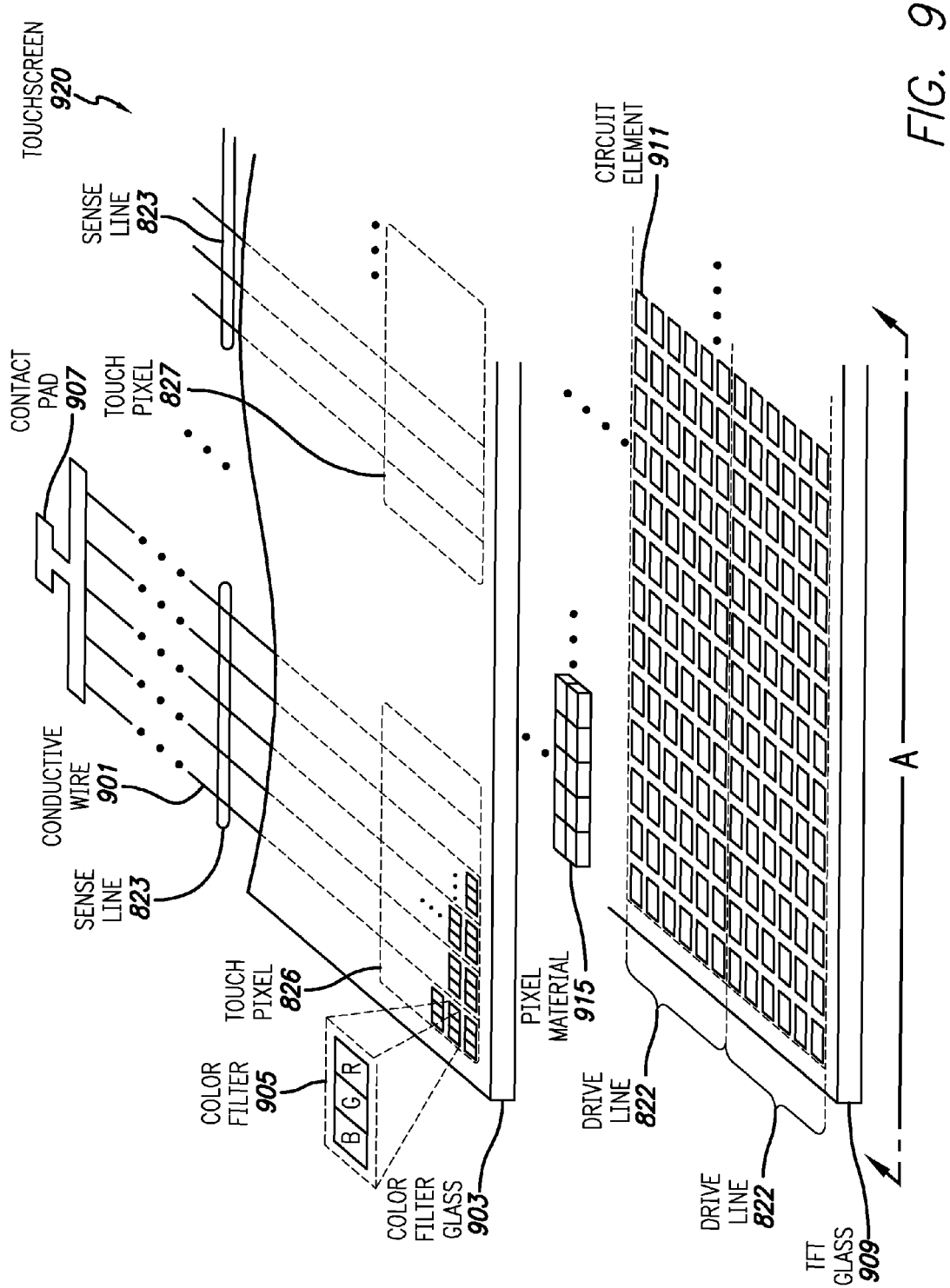
FIG. 9 illustrates example embodiments of sense lines, drive lines, and other example structures including Vcom segments of a touch screen according to various embodiments.

FIG. 9 illustrates example embodiments of sense lines, drive lines, and other example structures including Vcom segments of a touch screen according to various embodiments. FIG. 9 shows a more detailed view of a lower left hand portion of a touch screen 920, which can be one example embodiment of touch screen 820 as viewed along line "A" shown in FIG. 8. Although reference numerals of elements of FIG. 8 are used to describe the elements of touch screen 920, it should be understood that the elements of touch screen 920 are merely one example embodiment of the elements shown in FIG. 8. In the example embodiment shown in FIG. 9, each sense line 823 can include multiple conductive wires 901, e.g., five conductive wires in this example embodiment. Conductive wires 901 can be disposed on the underside of a color filter glass 903, which includes a plurality of color filters 905. In this example embodiment, color filters 905 each include three colors, blue (B), green (G), and red (R), such as in an RGB display. Each conductive wire 901 can be positioned between two columns of color filters 905. In this example, the space between the columns of the color filters can be widened to accommodate the conductive wire. The five conductive wires 901 of each sense line 823 are connected to a contact pad 907 that conductively connects the conductive wires of the sense line and allows each group of five conductive wires to operate as a single sense line. Contact pads 907 can be electrically connected to, for example, sense channels 808 of touch controller 806 shown in FIG. 8, so that sense signals 817 received by each sense line 823 can be processed by the touch controller.

FIG. 9 also shows a TFT glass 909, on which can be formed circuit elements 911.

Circuit elements 911 can be, for example, multi-function circuit elements that operate as part of the display circuitry of the touch screen and also as part of the touch sensing circuitry of the touch screen. In some embodiments, circuit elements 911 can be single-function circuit elements that operate only as part of the touch sensing system. In addition to circuit elements 911, other circuit elements (not shown) can be formed on TFT glass 909, such as transistors, capacitors, conductive vias, data lines, gate lines, etc. Circuit elements 911 and the other circuit elements formed on TFT glass 909 can operate together to perform various display functionality required for the type of display technology used by touch screen 920, as one skilled in the art would understand. The circuit elements can include, for example, elements that can exist in conventional LCD displays. It is noted that circuit elements are not limited to whole circuit components, such a whole capacitor, a whole transistor, etc., but can include portions of circuitry, such as only one of the two plates of a parallel plate capacitor.

Some of the circuit elements 911 can be electrically connected together to form drive lines 822. The example configurations of sense lines 823 and drive lines 822 shown in FIG. 9 can be laid out as shown in FIG. 8 as an overlapping orthogonal grid to form touch pixels 826 and 827, for example.

FIG. 9 also shows a pixel material 915 disposed between TFT glass 909 and color filter glass 903. Pixel material 915 can, for example, be divided among each display pixel of the touch screen. Pixel material 915 can be a material that, when operated on by the display circuitry of touch screen 920, can generate or control an amount, color, etc., of light produced by each display pixel. For example, in an LCD touch screen, pixel material 915 can be liquid crystal, with each display pixel including a cell of liquid crystal. In this case, for example, various methods exist for operating liquid crystal in a display operation to control the amount of light emanating from each display pixel, e.g., applying an electric field in a particular direction depending on the type of LCD technology employed by the touch screen. In an in-plane switching (IPS) LCD display, for example, electrical fields between pixel electrodes and common electrodes (Vcom) disposed on the same side of the liquid crystal can operate on the liquid crystal to control the amount of light from a backlight that passes through the display pixel. One skilled in the art would understand that various pixel materials can be used, depending on the type of display technology of the touch screen.

Figure 10:
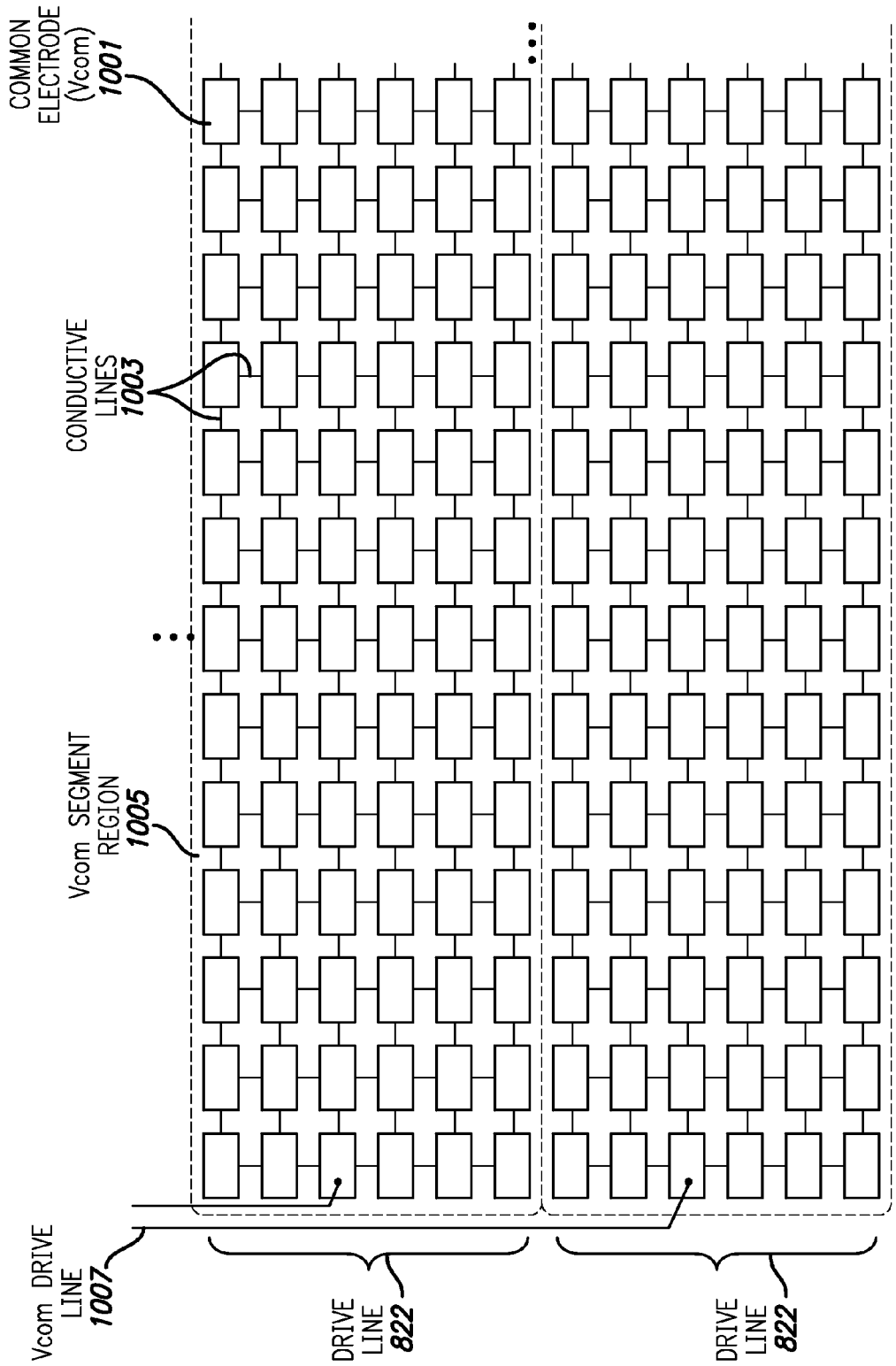
FIG. 10 illustrates a more detailed view of an example configuration of drive lines according to various embodiments.

FIG. 10 illustrates a more detailed view of an example configuration of drive lines 822 according to various embodiments. In this example embodiment, circuit elements 911 can include common electrodes (Vcom) 1001. Common electrodes 1001 can be operated as multi-function circuit elements that can operate as part of the display circuitry in a display operation and can operate as part of the touch sensing circuitry in a touch sensing operation of the touch screen. Common electrodes 1001 can be electrically connected together with conductive lines 1003 to form Vcom segment regions 1005 that can operate as drive lines 822 during a touch sensing operation, and that can operate as Vcom segments during a display operation. In this example embodiment, common electrodes in a particular functional region can be physically connected with fixed conductive lines. In other words, the common electrodes in each region can be permanently connected through the physical design of the touch screen, for example, grouped together to form drive lines. Grouping multi-function circuit elements of display pixels can include operating the multi-function circuit elements of the display pixels together to perform a common function of the group. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Stimulation signals can be applied to drive lines 822 through Vcom drive lines 1007. For example, Vcom drive lines 1007 can be electrically connected to driver logic 814, which can provide the stimulation signals during the touch sensing operation, and can provide Vcom signals during the display operation. For example, during the display operation, driver logic 814 can perform the method of operating Vcom segments to scan lines of display pixels as described above with reference to FIGS. 4-5.

In the example shown in FIG. 10, each common electrode (Vcom) 1001 can serve as a multi-function circuit element that can operate as display circuitry of the display system of touch screen 920 and can also operate as touch sensing circuitry of the touch sensing system. In this example, each common electrode 1001 can operate as a common electrode of the display circuitry of the touch screen, and can also operate together when grouped with other common electrodes as touch sensing circuitry of the touch screen. For example, a group of common electrodes 1001 can operate together as a part of a drive line of the touch sensing circuitry during the touch sensing operation. Other circuit elements of touch screen 920 can form part of the touch sensing circuitry by, for example, electrically connecting together common electrodes 1001 of a region, switching electrical connections, etc. Each display pixel can include a common electrode 1001, which can be a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some embodiments, some of the circuit elements in the display pixel stackups can be multi-function circuit elements and other circuit elements may be single-function circuit elements. In other embodiments, all of the circuit elements of the display pixel stackups may be single-function circuit elements.

Figure 12:
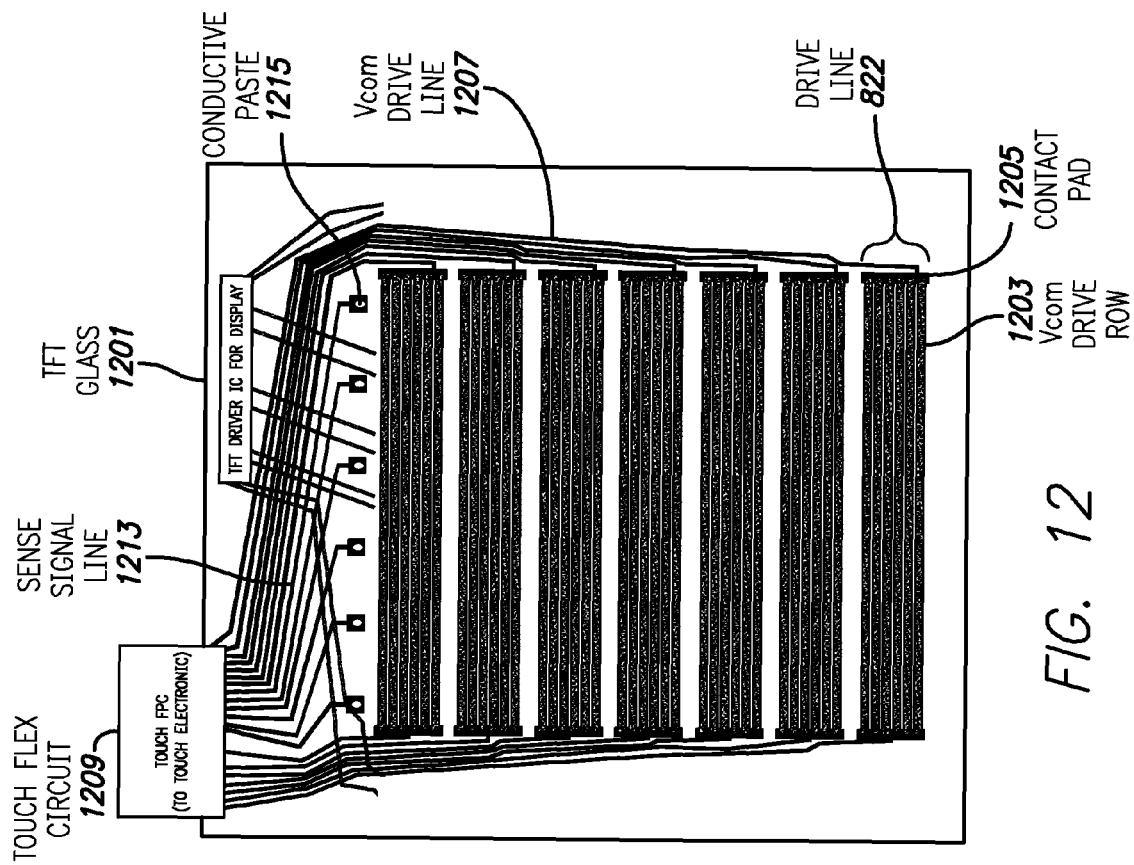
FIG. 12 illustrates an example TFT design according to various embodiments.
Figure 11:
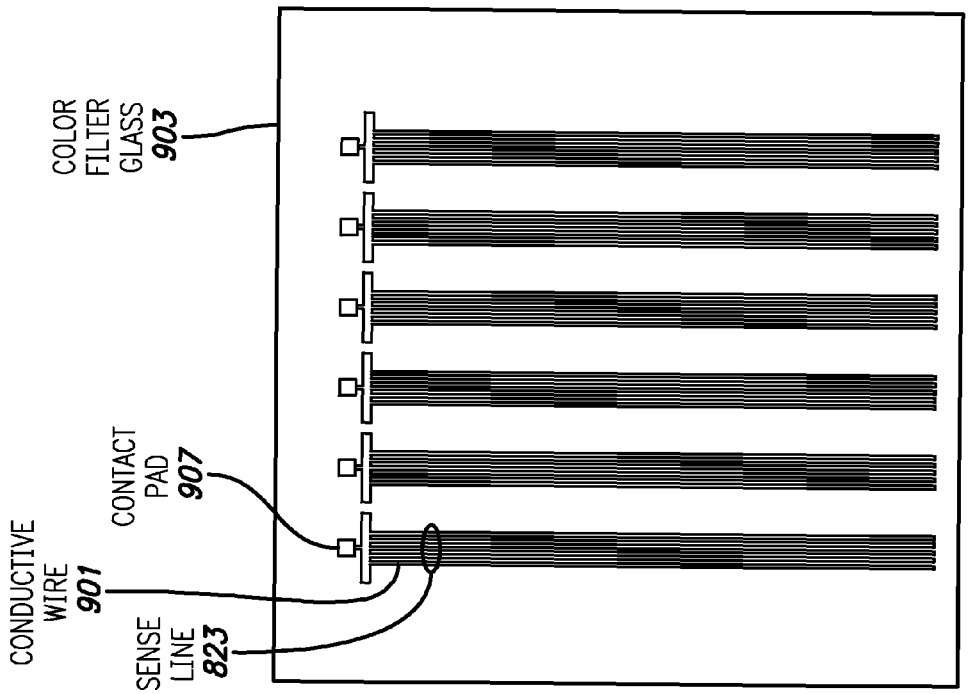
FIG. 11 illustrates an example color filter glass design according to various embodiments.

FIGS. 11-12 illustrate an example color filter glass design and an example TFT design, respectively, according to various embodiments. FIG. 11 includes an example configuration of multiple sense lines 823, each including multiple conductive wires such as conductive wires 901, connected to multiple contact pads, such as contact pad 911. For the sake of clarity, individual color filters are not shown in FIG. 11. In this example embodiment, conductive wires 901 and contact pads 907 can be formed on color filter glass 903 by, for example, physical vapor deposition (PVD) or other techniques known to those skilled in the art.

FIG. 12 illustrates an example TFT glass according to various example embodiments. TFT glass 1201 can include various touch sensing circuitry and display circuitry. Touch sensing circuitry can include, for example, drive lines 822. In this example embodiment, each drive line 822 can include multiple Vcom drive rows 1203. In this example embodiment, each Vcom drive row 1203 in a drive line 822 can be connected to a single conductive contact pad 1205 on the left side of the TFT glass, and connected to a single contact pad 1205 on the right side of TFT glass. Contact pads 1205 can be connected through Vcom drive lines 1207 through touch controller 806 through a touch flex circuit 1209. In this way, for example, multiple Vcom drive rows 1203 can be driven together as a single drive line 822 during a touch sensing operation, and driven together as a Vcom segment during a display operation. Touch flex circuit 1209 can also be connected to sense signal lines 1213, which can be connected to contact pads 907 on the color filter glass through conductive paste 1215.

Figure 13:
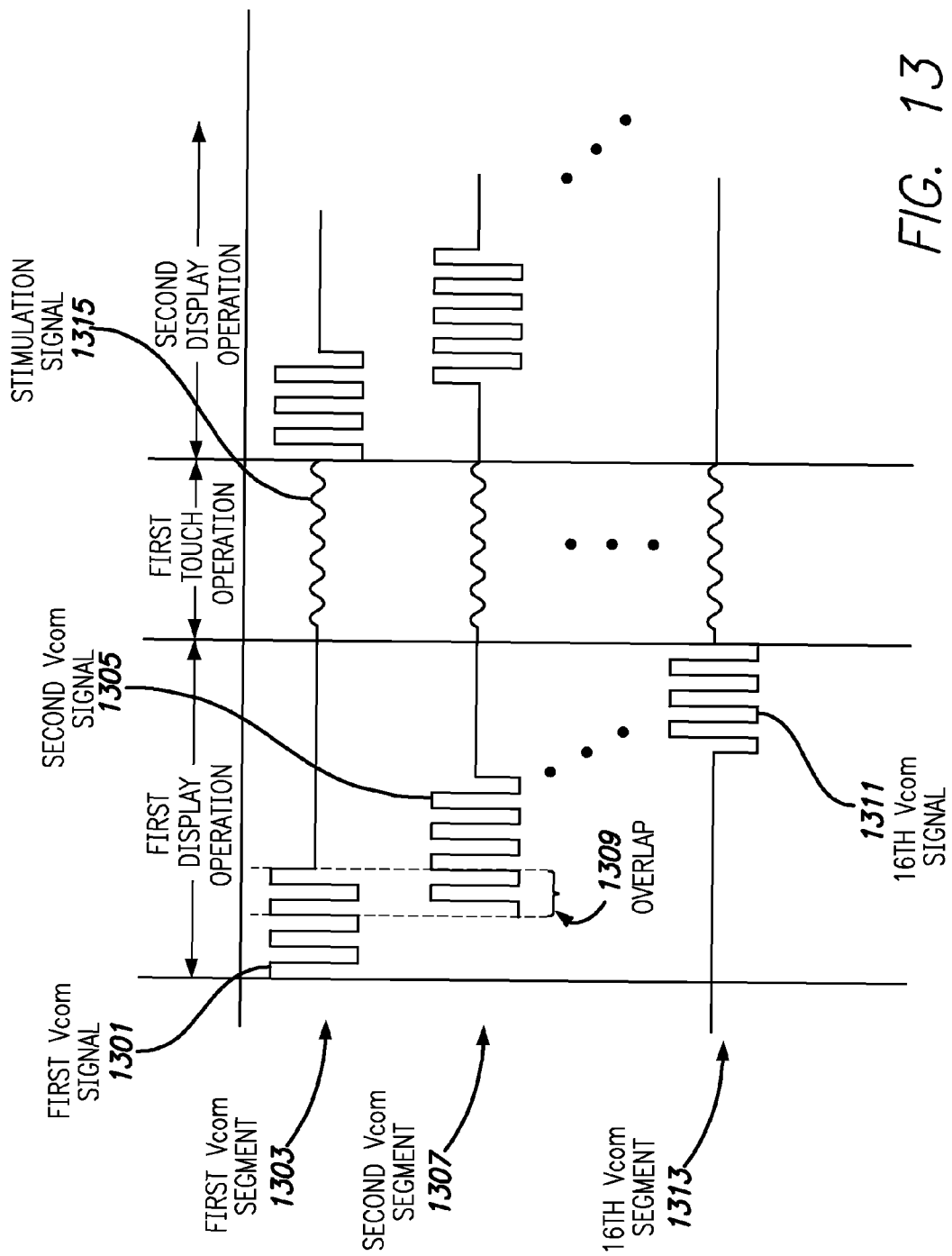
FIG. 13 illustrates a example method of operating a touch screen according to various embodiments.

FIG. 13 illustrates an example method of operating a touch screen including Vcom segments as described with respect to FIGS. 9-12. In a first display operation, touch screen 920 can be operated, for example, as in the method described with respect to FIGS. 4-5 to display an image. In particular, driver logic 814 can apply a first Vcom signal 1301 to a first Vcom segment 1303, LCD driver 834 can scan through a first set of scan lines associated with the first Vcom segment, the driver logic can apply a second Vcom signal 1305 to a second Vcom segment 1307, the LCD driver can scan a second set of scan lines associated with the first Vcom segment, the LCD driver can scan a third set of scan lines associated with the second Vcom segment (such that there is an overlap 1309 of the application of the first and second Vcom signals), the driver logic can discontinue applying the first Vcom signal, etc. The method can continue through the application of a 16th Vcom signal 1311 to a 16th Vcom segment 1313.

In a first touch sensing operation, driver logic can apply stimulation signals 1315 to all or some of the Vcom segments, thereby operating the Vcom segments as drive lines of the touch sensing system. Sense signals can be received on sense lines 823 and processed by touch controller 806. In some embodiments, the functionality of driver logic 814 and LCD driver 834 can be integrated into a single component.

Figure 14:
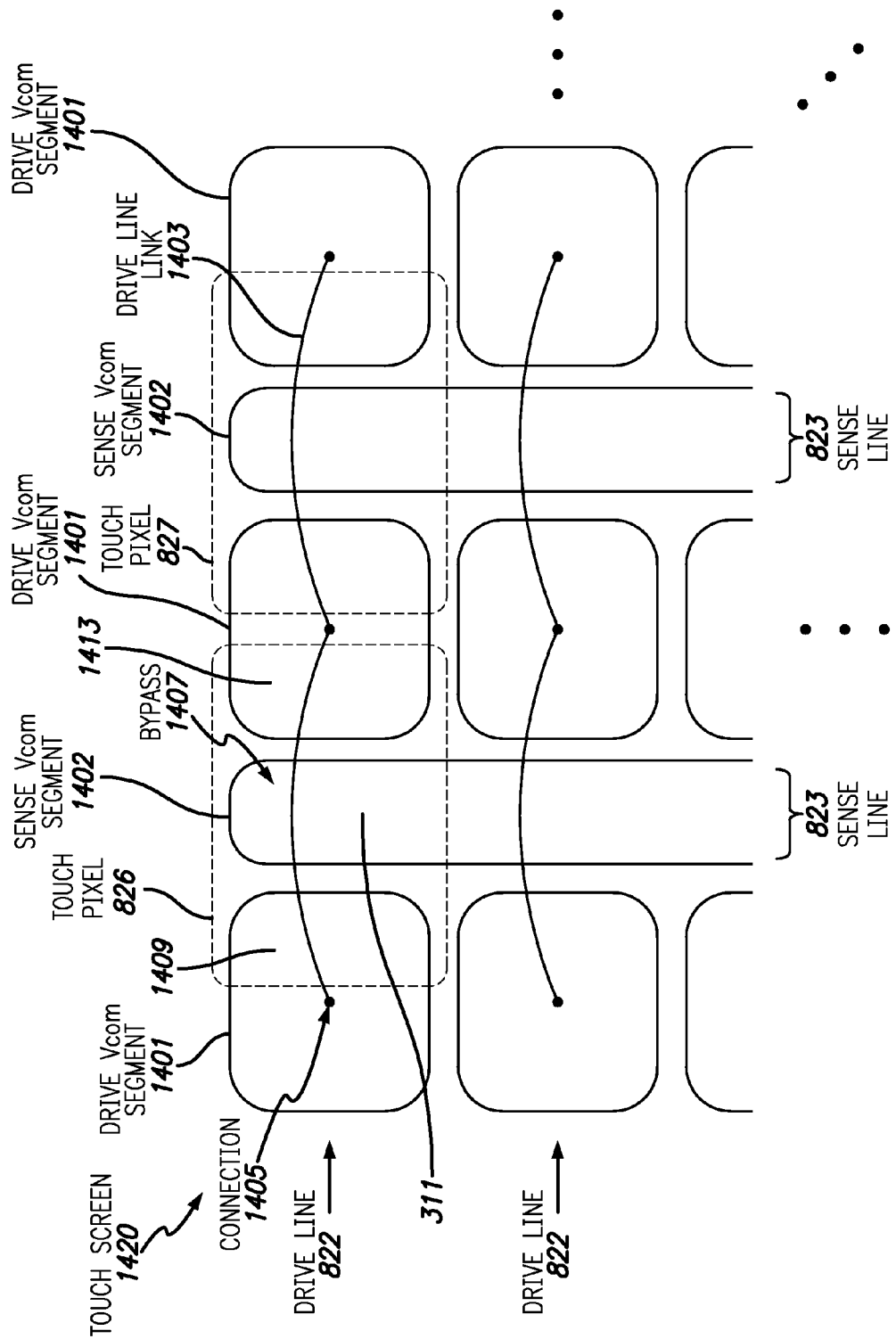
FIG. 14 illustrates example embodiments of sense lines and drive lines according to various embodiments.
Figure 15:
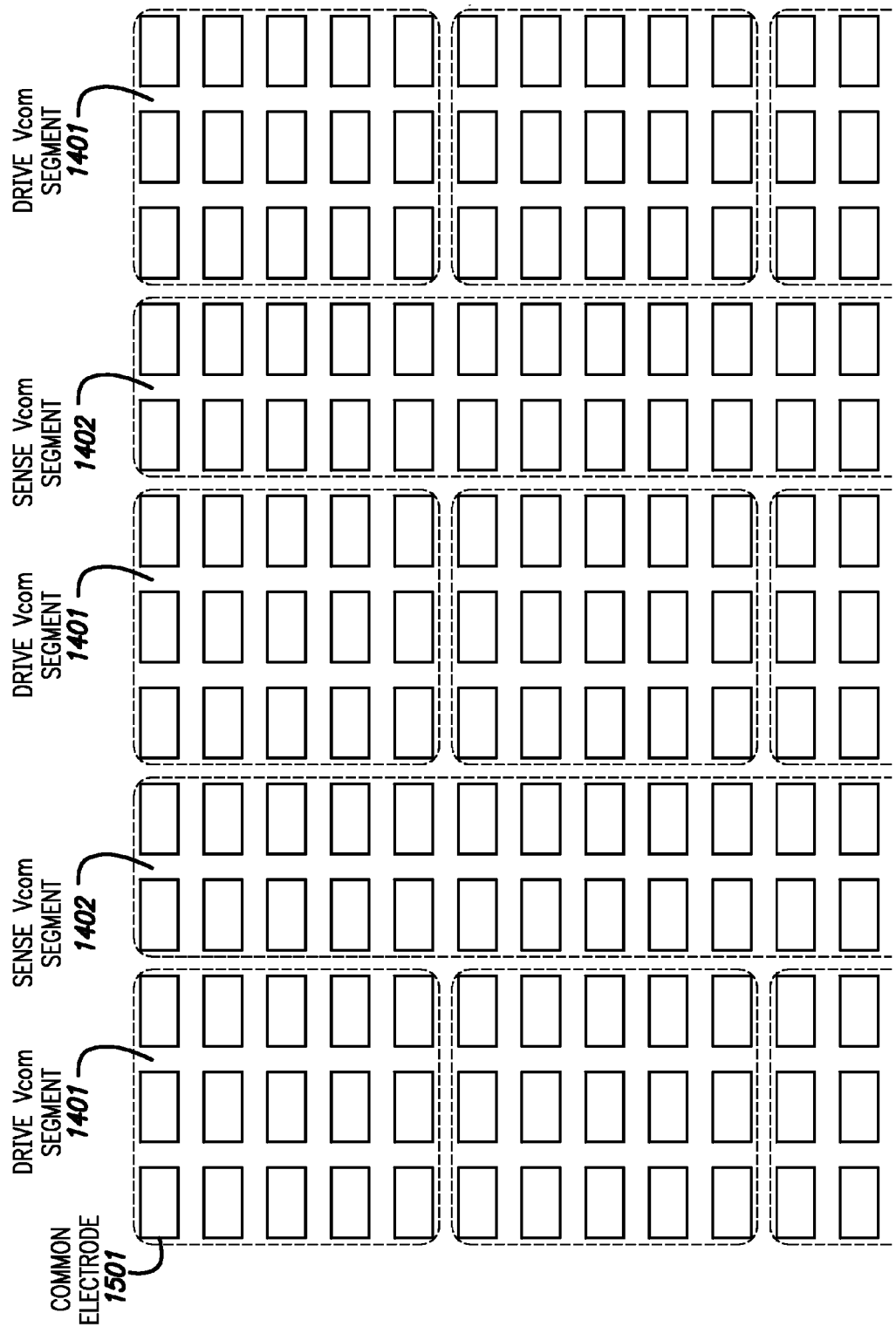
FIG. 15 further illustrates example embodiments of sense lines and drive lines according to various embodiments.

FIGS. 14-15 illustrate other example embodiments of sense lines and drive lines including Vcom segments according to various embodiments. Although reference numerals of elements of FIG. 8 are used to describe the elements of shown in FIGS. 14-15, it should be understood that the elements shown in FIGS. 14-15 are merely one example embodiment of the elements shown in FIG. 8. In the example embodiment shown in FIGS. 14-15, each drive line 822 and sense line 823 of a touch screen 1420 can include multiple circuit elements in the display pixel stackups, such as individual Vcoms associated with each of the display pixels. As shown in FIG. 14, each sense line 823 can be formed of a sense Vcom segment 1402, and each drive line 822 can be formed of multiple drive Vcom segments 1401 that can be electrically connected by drive line links 1403 at connections 1405. Drive line links 1403 are not electrically connected to sense Vcom segments 1402, rather, the drive line links can bypass the sense Vcom segments through bypasses 1407. Drive lines 822 and sense lines 823 can interact capacitively to form touch pixels such as touch pixels 826 and 827. Drive lines 822 (i.e., drive Vcom segments 1401 and corresponding drive line links 1403) and sense lines 823 can be formed of electrical circuit elements in touch screen 820, including individual Vcoms of the display pixels. In the example configuration of FIG. 14, each of touch pixels 826 and 827 can include a portion of one drive Vcom segment 1401, a portion of a sense Vcom segment 1402, and a portion of another drive Vcom segment 1401. For example, touch pixel 826 can include a right-half portion 1409 of a drive Vcom segment on one side of a portion 1411 of a sense Vcom segment, and a left-half portion 1413 of a drive Vcom segment on the opposite side of portion 311 of the sense Vcom segment.

The circuit elements can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 15 illustrates a more detailed view of the configuration of drive Vcom segments 1401 and sense Vcom segments 1402, showing each of the segments including multiple individual Vcoms 1501. For the sake of clarity, FIG. 15 omits drive line links 1403 and other elements of touch screen 1420.

Figure 16:
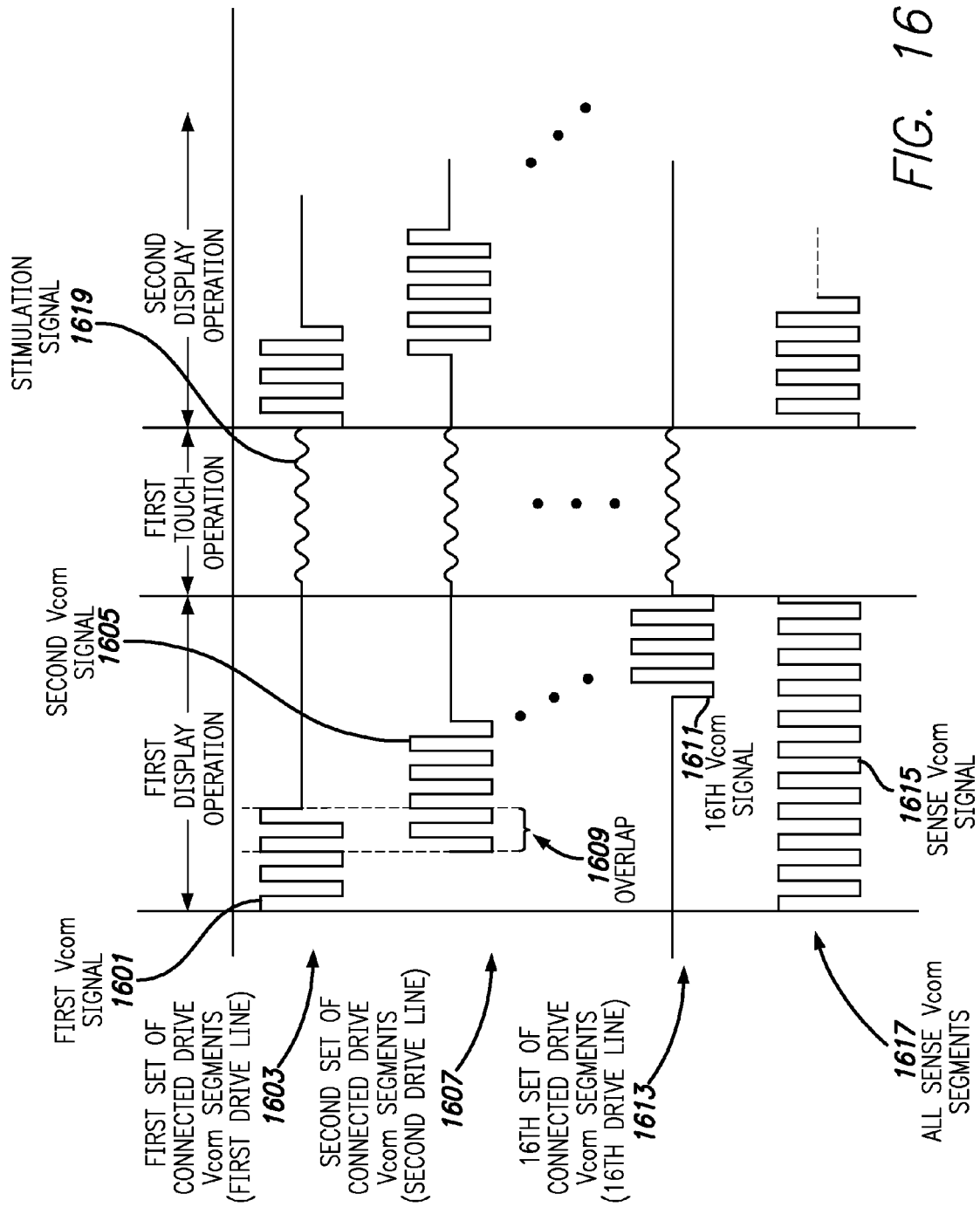
FIG. 16 illustrates a example method of operating a touch screen according to various embodiments.

FIG. 16 illustrates a example method of operating a touch screen including Vcom segments as described with respect to FIGS. 8 and 14-15. In a first display operation, driver logic 814 can apply a sense Vcom signal to all segments 1617 of sense Vcom segments 1402, the driver logic can apply a first Vcom signal 1601 to a first set 1603 of drive Vcom segments 1401 (i.e., a first drive line), LCD driver 834 can scan through a first set of scan lines associated with the first set of Vcom drive segments (it is noted that the scan lines also run through corresponding portions of sense Vcom segments 1402), the driver logic can apply a second Vcom signal 1605 to a second set 1607 of the drive Vcom segments, the LCD driver can scan a second set of scan lines associated with the first set of the drive Vcom segments, the LCD driver can scan a third set of scan lines associated with the second set of drive Vcom segments (such that there is an overlap 1609 of the application of the first and second Vcom signals), the driver logic can discontinue applying the first Vcom signal, etc. The method can continue through the application of a 16th Vcom signal 1311 to a 16th set 1613 of drive Vcom segments, and application of sense Vcom signal 1615 can be discontinued.

In a first touch sensing operation, driver logic can apply stimulation signals 1619 to all or some of the sets of drive Vcom segments, thereby operating the sets of drive Vcom segments as drive lines of the touch sensing system. Sense signals can be received on sense Vcom segments 1402 and processed by touch controller 806. In some embodiments, the functionality of driver logic 814 and LCD driver 834 can be integrated into a single component.

Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures.

For example, one or more of the functions of computing system 800 described above can be performed by firmware stored in memory (e.g. one of the peripherals 804 in FIG. 8) and executed by touch processor 802, or stored in program storage 832 and executed by host processor 828. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Example embodiments may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the elements to a particular direction or a particular coordinate system. Furthermore, although specific materials and types of materials may be included in the descriptions of example embodiments, one skilled in the art will understand that other materials that achieve the same function can be used.

In some embodiments, the drive lines and/or sense lines can be formed of other elements including, for example other elements already existing in typical LCD displays (e.g., other electrodes, conductive and/or semiconductive layers, metal lines that would also function as circuit elements in a typical LCD display, for example, carry signals, store voltages, etc.), other elements formed in an LCD stackup that are not typical LCD stackup elements (e.g., other metal lines, plates, whose function would be substantially for the touch sensing system of the touch screen), and elements formed outside of the LCD stackup (e.g., such as external substantially transparent conductive plates, wires, and other elements). For example, part of the touch sensing system can include elements similar to known touch panel overlays.

Although various embodiments are described with respect to display pixels, one skilled in the art would understand that the term display pixels can be used interchangeably with the term display sub-pixels in embodiments in which display pixels are divided into sub-pixels. For example, some embodiments directed to RGB displays can include display pixels divided into red, green, and blue sub-pixels. In other words, in some embodiments, each sub-pixel can be a red (R), green (G), or blue (B) sub-pixel, with the combination of all three R, G and B sub-pixels forming one color display pixel. One skilled in the art would understand that other types of touch screen could be used. For example, in some embodiments, a sub-pixel may be based on other colors of light or other wavelengths of electromagnetic radiation (e.g., infrared) or may be based on a monochromatic configuration, in which each structure shown in the figures as a sub-pixel can be a pixel of a single color.

What is claimed is:

1. A method of displaying an image on a display including a plurality of lines of display pixels, each display pixel being associated with a common electrode, the method comprising:
   applying a first signal to the common electrode associated with each of a plurality of display pixels in a first group of display pixels, the first group including one or more of the plurality of lines of display pixels, wherein the first signal is an alternating current signal;
   scanning a first set of the lines of display pixels of the first group while not applying a second signal to the common electrode associated with each of a plurality of display pixels in a second group of display pixels, the second group including one or more of the plurality of lines of display pixels different from the first group, wherein the second signal is an alternating current signal;
   applying the second signal to the common electrode associated with each of the plurality of display pixels in the second group;
   scanning a second set of the lines of display pixels of the first group while the first and second signals are being applied
   discontinuing application of the first signal; and
   scanning a third set of the lines of display pixels of the second group while the second signal is being applied.

2. The method of claim 1, wherein scanning the third set of the lines includes scanning the third set of the lines prior to discontinuing application of the first signal, such that the third set of lines is scanned while the first and second signals are being applied.

3. The method of claim 2, the method further comprising:
   scanning a fourth set of the lines of display pixels of the second group while the second signal is being applied and after discontinuation of the first signal.

4. The method of claim 1, wherein the common electrode associated with each of the plurality of display pixels in the first group includes a first common electrode that is a contiguous layer of conductive material associated with a plurality of the display pixels.

5. The method of claim 1, wherein the common electrode associated with each of the plurality of display pixels in the first group includes an individual common electrode associated with each of the display pixels, wherein a plurality of the individual common electrodes are electrically connected together.

6. The method of claim 5, wherein all of the individual common electrodes associated with the display pixels in the first group are electrically connected together through a plurality of conductive lines within a plurality of stackups of the display pixels.

7. The method of claim 5, wherein a first subset of the individual common electrodes are electrically connected together, a second subset of the individual common electrodes are electrically connected together, and the first and second subsets are electrically disconnected within a plurality of stackups of the display pixels.

8. The method of claim 1, wherein the common electrode associated with the display pixels in the second group is electrically floating after discontinuing application of at least one of the first or second signal to the common electrode.

9. The method of claim 1, wherein the common electrode associated with the display pixels in the second group is electrically connected to a fixed voltage after discontinuing application of at least one of the first or second signal to the common electrode.

10. The method of claim 1, wherein applying the first and second signals occur during a display operation, the method further comprising:
    operating, during a touch sensing operation, the common electrodes associated with each of the display pixels in the first group as one of a drive line and a sense line, wherein operating the common electrodes as the drive line includes applying stimulation signals to the common electrodes, and operating the common electrodes as the sense line includes receiving sense signals from the common electrodes.

11. The method of claim 10, further comprising:
    applying a third signal to the common electrode associated with each of a plurality of display pixels in a third group, wherein the third signal is an alternating current signal, the third signal being applied during the scanning of the first, second, and third sets of lines.

12. The method of claim 11, wherein the third group includes the display pixels in the first, second, and third sets of lines.

13. The method of claim 11, further comprising:
    operating, during the touch sensing operation, the common electrodes associated with each of the display pixels in the third group as the drive line, if the common electrodes associated with the first group are being operated as the sense line, and operating the common electrodes associated with the third group as the sense line, if the common electrodes associated with the first group are being operated as the drive line.

14. A non-transitory computer-readable storage medium storing computer-executable instructions executable to perform a method of displaying an image on a display including a plurality of lines of display pixels, each display pixel being associated with a common electrode, the method comprising:
    applying a first signal to the common electrode associated with each of a plurality of display pixels in a first group of display pixels, the first group including one or more of the plurality of lines of display pixels, wherein the first signal is an alternating current signal;
    scanning a first set of the lines of display pixels of the first group while not applying a second signal to the common electrode associated with each of a plurality of display pixels in a second group of display pixels, the second group including one or more of the plurality of lines of display pixels different from the first group, wherein the second signal is an alternating current signal;
    applying the second signal to the common electrode associated with each of the plurality of display pixels in the second group;
    scanning a second set of the lines of display pixels of the first group while the first and second signals are being applied;
    discontinuing application of the first signal; and
    scanning a third set of the lines of display pixels of the second group while the second signal is being applied.

15. The non-transitory computer-readable storage medium of claim 14, wherein scanning the third set of the lines includes scanning the third set of the lines prior to discontinuing application of the first signal, such that the third set of lines is scanned while the first and second signals are being applied.

16. The non-transitory computer-readable storage medium of claim 15, the method further comprising:

scanning a fourth set of the lines of display pixels of the second group while the second signal is being applied and after discontinuation of the first signal.

17. The non-transitory computer-readable storage medium of claim 15, wherein the common electrode associated with each of the plurality of display pixels in the first group includes a first common electrode that is a contiguous layer of conductive material associated with a plurality of the display pixels.

18. The non-transitory computer-readable storage medium of claim 15, wherein the common electrode associated with each of the plurality of display pixels in the first group includes an individual common electrode associated with each of the display pixels, wherein a plurality of the individual common electrodes are electrically connected together.

19. The non-transitory computer-readable storage medium of claim 18, wherein all of the individual common electrodes associated with the display pixels in the first group are electrically connected together through a plurality of conductive lines within a plurality of stackups of the display pixels.

20. The non-transitory computer-readable storage medium of claim 18, wherein a first subset of the individual common electrodes are electrically connected together, a second subset of the individual common electrodes are electrically connected together, and the first and second subsets are electrically disconnected within a plurality of stackups of the display pixels.

21. The non-transitory computer-readable storage medium of claim 15, wherein the common electrode associated with the display pixels in the second group is electrically floating after discontinuing application of at least one of the first or second signal to the common electrode.

22. The non-transitory computer-readable storage medium of claim 15, wherein the common electrode associated with the display pixels in the second group is electrically connected to a fixed voltage after discontinuing application of at least one of the first or second signal to the common electrode.

23. The non-transitory computer-readable storage medium of claim 15, wherein applying the first and second signals occur during a display operation, the method further comprising:
 operating, during a touch sensing operation, the common electrodes associated with each of the display pixels in the first group as one of a drive line and a sense line, wherein operating the common electrodes as the drive line includes applying stimulation signals to the common electrodes, and operating the common electrodes as the sense line includes receiving sense signals from the common electrodes.

24. The non-transitory computer-readable storage medium of claim 23, further comprising:
 applying a third signal to the common electrode associated with each of a plurality of display pixels in a third group, wherein the third signal is an alternating current signal, the third signal being applied during the scanning of the first, second, and third sets of lines.

25. The non-transitory computer-readable storage medium of claim 24, wherein the third group includes the display pixels in the first, second, and third sets of lines.

26. The non-transitory computer-readable storage medium of claim 24, further comprising:
 operating, during the touch sensing operation, the common electrodes associated with each of the display pixels in the third group as the drive line, if the common electrodes associated with the first group are being operated as the sense line, and operating the common electrodes associated with the third group as the sense line, if the common electrodes associated with the first group are being operated as the drive line.

* * * * *